United States Patent [19]

Selbie et al.

[11] Patent Number: 5,194,149

[45] Date of Patent: Mar. 16, 1993

[54] FILTER CARTRIDGE MANIFOLD

[75] Inventors: Michael R. L. Selbie; Bruce G. Biltoft, both of New South Wales, Australia

[73] Assignee: Memtec Limited, Australia

[21] Appl. No.: 700,128

[22] PCT Filed: Sep. 28, 1990

[86] PCT No.: PCT/AU90/00470

§ 371 Date: May 24, 1991

§ 102(e) Date: May 24, 1991

[87] PCT Pub. No.: WO91/04783

PCT Pub. Date: Apr. 18, 1991

[30] Foreign Application Priority Data

Sep. 29, 1989 [AU] Australia .............. PJ6651

[51] Int. Cl.[5] ............................. B01D 27/08
[52] U.S. Cl. ........................... 210/232; 210/253; 210/254; 210/321.79; 210/497.01; 55/158; 55/343
[58] Field of Search ............... 210/232, 252, 254, 428, 210/321.6, 321.72, 321.78, 321.79, 321.8, 433.1, 497.01; 55/342, 343, 158

[56] References Cited

U.S. PATENT DOCUMENTS

| | | | |
|---|---|---|---|
| 4,192,750 | 3/1980 | Elfes et al. | 210/253 |
| 4,744,900 | 5/1988 | Bratt | 210/321.78 |
| 4,876,012 | 10/1989 | Kopp et al. | |
| 5,034,125 | 7/1991 | Karbachsch et al. | 210/321.8 |
| 5,089,131 | 2/1992 | Gentry | 210/253 |

FOREIGN PATENT DOCUMENTS

| | | |
|---|---|---|
| 217780 | 1/1957 | Australia . |
| 79644 | 3/1988 | Australia . |
| 0335647 | 10/1989 | European Pat. Off. . |
| 1391839 | 4/1975 | United Kingdom . |
| 1469571 | 3/1977 | United Kingdom . |
| 2011274 | 7/1979 | United Kingdom . |

Primary Examiner—Robert A. Dawson
Assistant Examiner—W. L. Millard
Attorney, Agent, or Firm—Waldron & Associates

[57] ABSTRACT

A manifold structure for connecting rows of cartridges (100) to adjacent like rows of cartridges (100). The manifold structure includes a first fluid passage (153, 183) adapted to pass either feed or filtrate through the body of the manifold structure, a second fluid passageway (169, 197) adapted to be coupled to a first passageway of a filter cartridge to provide fluid communication between the cartridge and the first passageway, a third fluid passageway (167, 199) adapted to be coupled to a second passageway of the filter cartridge to provide fluid communication between the cartridge and the first passageway; only one of the second fluid passageway or the third fluid passageway being enabled for fluid communication at any one time. This manifold structure allows construction of a filter installation comprising a plurality of rows of interconnected filter cartridges (100) whereby feed and filtrate flow can be made to run in parallel through connected rows of filter cartridges (100) using readily interchangeable manifold components. The manifolds also allow installation of blocking or wafer valves (241) for the purpose of either series connecting groups of parallel connected filter cartridges or for flow regulation.

27 Claims, 17 Drawing Sheets

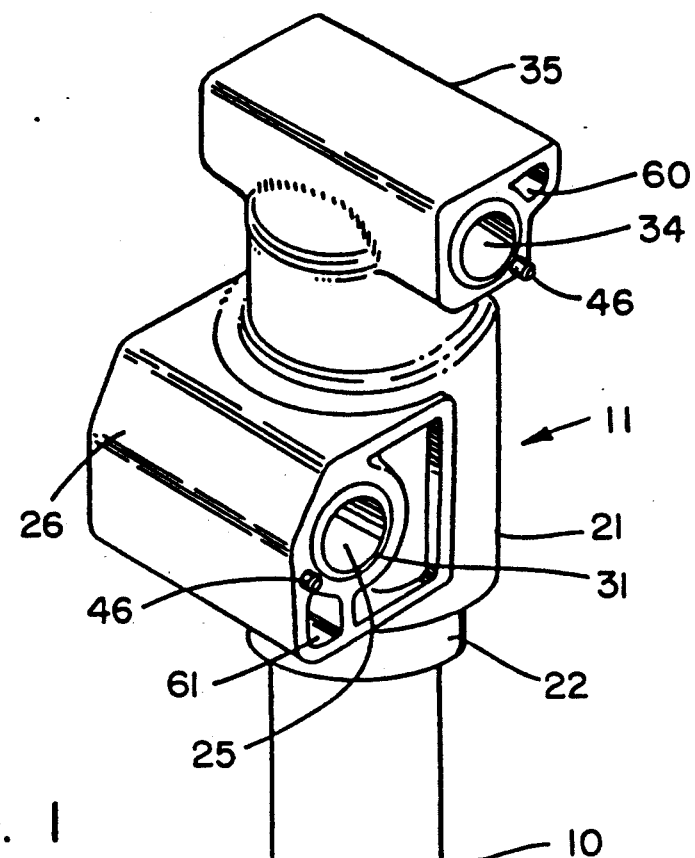
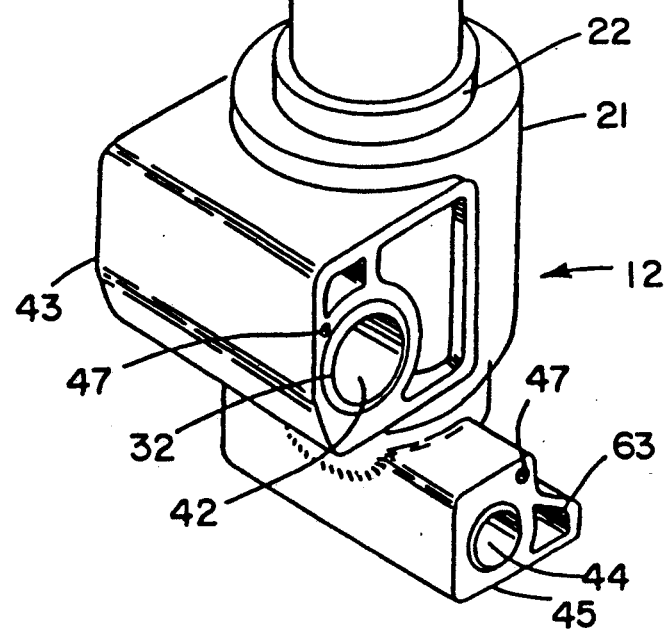
FIG. 1

FILTER CARTRIDGE MANIFOLD

This invention relates to end manifolds for filter cartridges.

DESCRIPTION OF PRIOR ART

A typical filter cartridge to which the invention may be applied is shown in our International Patent Application PCT/AU87/00309 and includes a bundle of hollow fibres within a casing. At one end of the casing there is a first header which has a feed passageway therethrough and in communication with the interior of the casing and the exterior of the fibres. The first header also has a filtrate passageway therethrough and in communication with the open ends of the fibres.

At the other end of the casing there is a second header which has a treated feed passageway therethrough and in communication with the interior of the casing and the exterior of the fibres. The second header also has a filtrate passageway therethrough and in communication with the open end of the fibres.

The passageways are formed in off-set portions of the headers that have planar end faces whereby a plurality of such cartridges may be joined together without interconnecting manifolds or pipe work to form a row of filter cartridges. A number of such rows of filter cartridges may be interconnected in spaced parallel relation to define a bank of filter cartridges.

It is an object of the invention to provide an end manifold for a row of filter cartridges and for connecting rows of filter cartridges together. It is a further object of the invention to provide a manifold which may be connected to the feed inlet and treated feed outlet of a row of cartridges and which with minor mould changes may be adapted for connection to the filtrate passageways of the row of cartridges.

SUMMARY OF THE INVENTION

According to the invention there is provided a filter cartridge connector means for a filter installation of the type in which a plurality of filter cartridges are assembled with a plurality of said connector means to form a plurality of rows of interconnected filter cartridges, characterised in that said connector means comprises a manifold having a body having planar faces at opposite ends to facilitate connection to similar adjacent manifolds, a first fluid passage through the body providing communication from one end of the body to the other so as to permit fluid connection with adjacent manifolds, a second fluid passageway adapted to be coupled to a passageway of the filter cartridge to provide fluid communication between the cartridge and the first passageway when so assembled.

Preferably, the body is formed with a recess around the opening to the first passageway in one end face for receiving an "O" ring and a bevelled annular projection around the opening to the first passageway in the other end face adapted to engage the "O" ring of an adjacent manifold. The end faces of the manifold may include locking means adapted to engage complementary locking means on an adjacent manifold.

The invention also provides a filter installation comprising a plurality of rows of interconnected filter cartridges, each said cartridge having a feed inlet, a treated feed outlet and a filtrate outlet, manifold means at each end of each row of cartridges for providing feed to each row, for withdrawing treated feed from each row and for withdrawing permeate from each row, the manifolds being interconnected so that at least two of the rows may be connected in parallel.

Preferably such a filter istallation further includes check valve means so that a first plurality of rows connected in parallel may be serially connected to a second plurality of rows connected in parallel.

The invention further provides a manifold for a filter cartridge comprising a body having substantially planar faces at opposite ends to facilitate connection to similar adjacent manifolds, a first fluid passage through the body providing communication from one end of the body to the other so as to permit fluid connection with adjacent manifolds; a second fluid passageway adapted to be coupled to a first passageway of the filter cartridge to provide fluid communication between the cartridge and the first passageway; a third fluid passageway adapted to be coupled to a second passageway of the filter cartridge to provide fluid communication between the cartridge and the first passageway; only one of said second fluid passageway or said third fluid passageway being enabled for fluid communication.

BRIEF DESCRIPTION OF THE DRAWINGS

In order that the invention may be more readily understood and put into practical effect reference will now be made to the accompanying drawings in which:

FIG. 1 is a perspective view of a filter cartridge of the prior art,

DETAILED DESCRIPTION OF PREFERRED EMBODIMENTS

Figure 2:
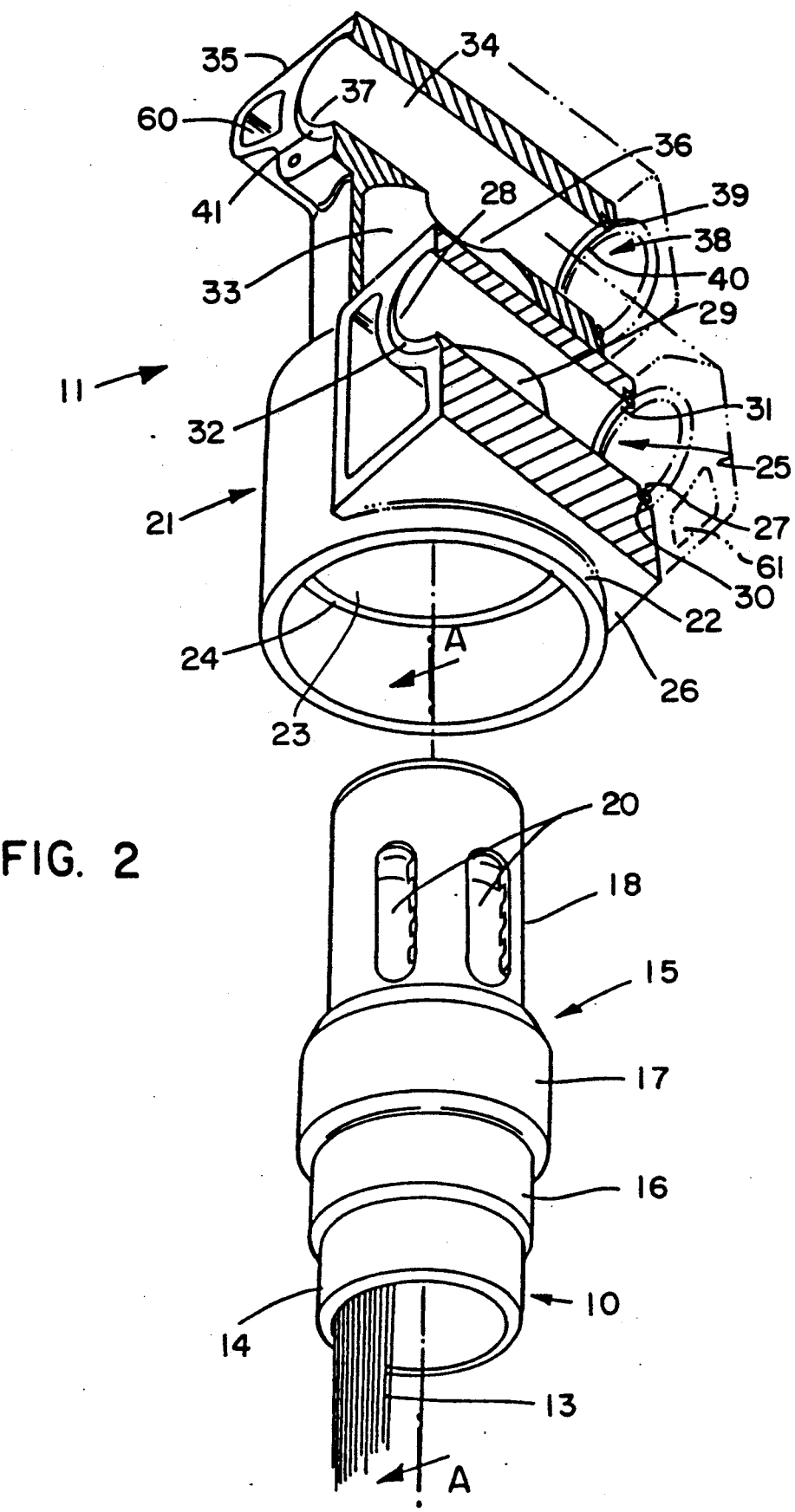
FIG. 2 is an exploded, partly cut away view of one end of the filter cartridge shown in FIG. 1.
Figure 3:
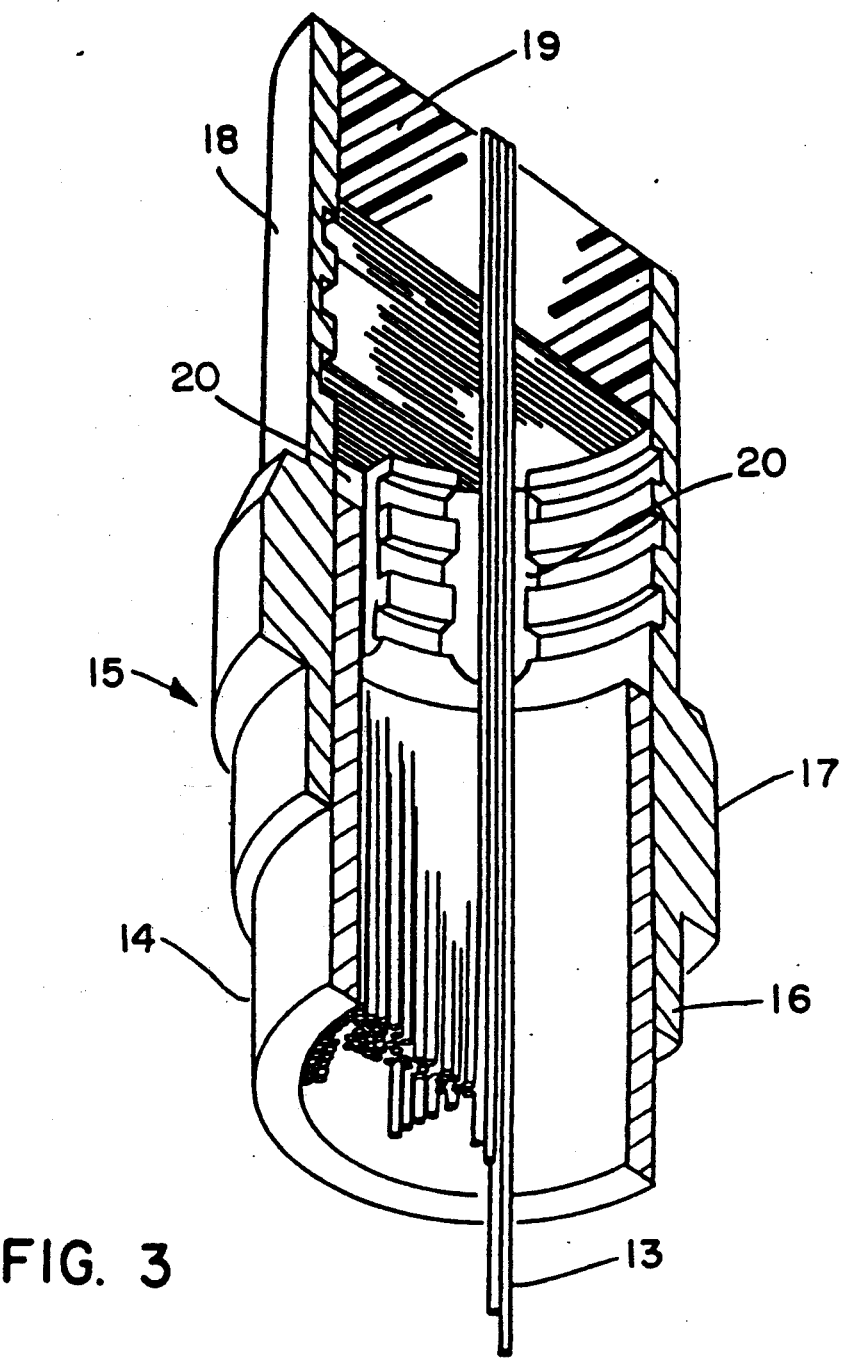
FIG. 3 is a view taken along lines A—A of FIG. 2.

The manifolds shown in FIGS. 6 to 8 and 9 to 11 are particularly suitable for use with the filter cartridge shown in FIGS. 1 to 3. The cartridge includes a casing 10, a first transfer header 11 at the top of the casing 10 and a second transfer header 12 at the bottom of the casing 10. The casing 10 contains a bundle of hollow, porous, polymeric fibres 13 (see FIGS. 2 and 3). In this instance, each fibre, which is made of polypropylene, has an average pore size of 0.2 micron, a wall thickness of 200 micron and lumen diameter of 200 micron. There are 3,000 hollow fibres in the bundle 13 but this number, as well as the individual fibre dimensions, may be varied according to operational requirements.

The top of the casing 10 is shown in FIGS. 2 and 3 and, in this instance, the bottom of the casing 10 is the same although this need not be so.

As can be seen in FIGS. 2 and 3, the casing 10 consists of a main tube 14 and an end portion 15 which includes a skirt 16, a collar 17 and an end piece 18. The main tube 14 which is bonded both to the skirt 16 and the collar 17 terminates beneath the collar 17.

The end piece 18 has a plug 19 (see FIG. 3) of polyurethane resin in which is embedded the upper ends of the fibres 13 whereby the plug 19 prevents flow of fluid out of the end of the casing 10 other than through the lumens of the fibres 13. Transfer ports 20 are formed in the end piece 18 beneath the plug 19.

As can be seen in FIG. 2, the main body 21 of the header 11 has a skirt 22 which depends downwardly from the body 21 and receives the collar 17. In this instance, the collar 17 is bonded to the skirt 22, however, it may be releasably secured thereto by means of "O" rings.

The internal diameter of the main body 21 is larger than the external diameter of the end piece 18 of the casing 10 to provide an annular inlet chamber therebetween that is closed at the top by an inner shoulder 24 of the header 11 and at the bottom by the collar 17 of the casing 10.

The header 11 has a feed passageway 25 extending through an off-set portion 26 of the body 21. The feed passageway 25 has an inlet 27 at one end for receiving feed to be treated, an outlet 28 at the other end adapted to be connected to the inlet of the feed passageways of an adjacent top header and a discharge port 29 for delivering feed to the inlet chamber 23. Around the periphery of the inlet 27 there is a recess 30 which receives an "O" ring 31 and around the periphery of the outlet 28 there is a bevelled annular projection 32. As can be seen in FIGS. 1 and 2, the end faces of the off-set portion 26 are planar and parallel.

Transfer apertures 20 in the end piece 18 of casing 10 permit flow of feed from the inlet chamber 23 to the interior of the casing 10 where it is applied to the external surfaces of the fibres 13. Filtrate drawn off from the lumens of the fibres 13 is collected in the outlet chamber 33.

A filtrate passageway 34 that extends through the top portion 35 of the header 11 has a receiving port 36 for receiving filtrate from the outlet chamber 33, an outlet 37 at one end for discharging filtrate and an inlet 38 at the other end adapted to be connected to the outlet of the filtrate passageway of an adjacent top header. Around the periphery of the inlet 38 there is a recess 39 which receives an "O" ring 40 and around the periphery of the outlet 37 there is a bevelled annular projection 41. As can be seen in FIGS. 1 and 2, the end faces of the top portion are planar and parallel.

In this embodiment of the invention, a similar header 12 is provided at the bottom of the casing 10 which has a treated feed passageway 42 in an off-set portion 43 of the body 21 and a filtrate passageway 44 that extends through bottom portion 45 of the header 12. In all other respects, the bottom header 12 is the same as the top header 11.

Figure 4:
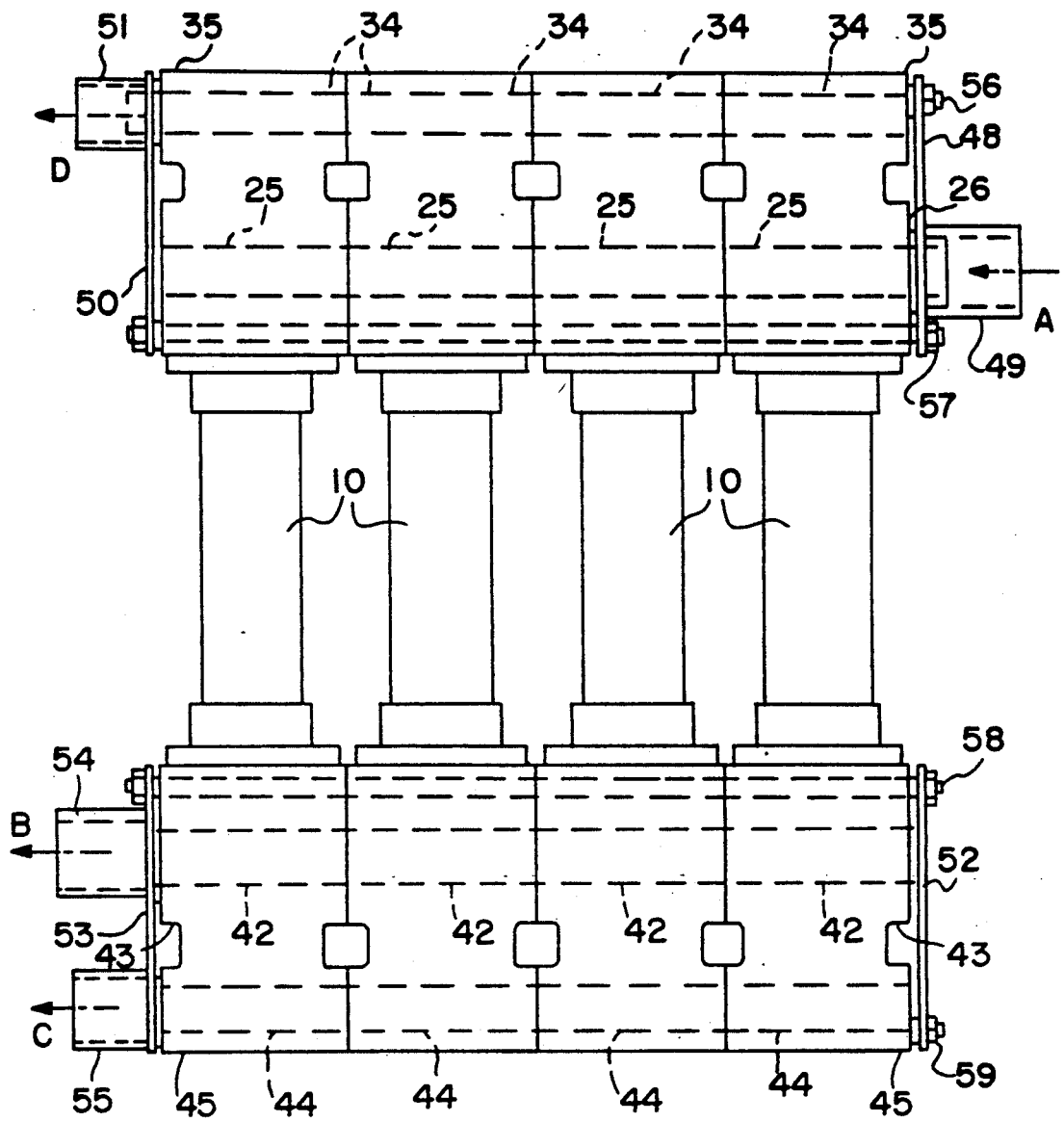
FIG. 4 is a front elevational view of an assembly of filter cartridges shown in FIGS. 1 to 3.

Filter units as described in relation to FIGS. 1 to 3 may be assembled together to form a row of filter units as shown in FIG. 4 without the need for pipe work or additional manifolds between each filter unit. To achieve this, the planar end faces of the off-set portions 26 and 43 and of the top and bottom portions 35 and 45 of the headers 11 and 12 are butted against the end faces of adjacent filter units. Correct alignment of the feed passageways 25, the treated feed passageways 42 and the filtrate passageways 34 and 44 is assured by means of pins 46 in the end faces which engage in recesses 47 in the adjacent end faces.

The right hand end faces of the off-set portion 26 and the top portion 35 of the right hand header 11 of the bank in FIG. 4 are covered by a first closure plate 48 having an inlet means 49 in communication with the inlet 27 to the feed passageway 25 of the right hand header 11. The left hand end faces of the portions 26 and 35 of the left hand header 11 are closed by a second closure plate 50 having outlet means 51 in communication with the outlet 37 of the filtration passageways 34 of the left hand header 11.

The right hand end faces of the off-set portion 43 and bottom portion 45 of the right hand bottom header 11 are covered by a third closure plate 52 which closes both the inlet 38 to filtrate passageway 44 and the inlet 25 to the treated feed passageway 42 of the right hand header 12. A fourth closure plate 53 having outlet means 54 in communication with the treated feed passageway 42 and outlet means 55 in communication with the filtrate passage 44 of the right hand header 12. Thus, feed is introduced into the bank 10 of cartridges in the direction of arrow A and passes through the connected passageways 25, treated feed is discharged from connected passageways 42 in the direction of arrow B and filtrate is drawn off from the connected passageways 34 and 44 in the direction of arrows C and D.

The filter units of the row in FIG. 4 are held together by bolts 56, 57, 58 and 59 which pass through respective passageways 60, 61, 62 and 63 (see FIG. 1) formed in the top portions 35, the off-set portions 26 and 43 and the bottom portion 45 respectively of the headers 11 and 12. The bolts 56 to 59 also retain the closure plates 48, 50, 52 and 53. When the bolts are secured in position, the respective bevelled annular projections 32, 41 engage against the "O" rings 31 and 40 to effect a seal between adjacent filter units.

In accordance with the present invention, the closure plates 48, 52, 50 and 53 as well as inlet and outlet means 49, 51, 53 and 55 are replaced by the manifolds shown in FIGS. 6 to 8 and 9 to 11.

Figure 5:
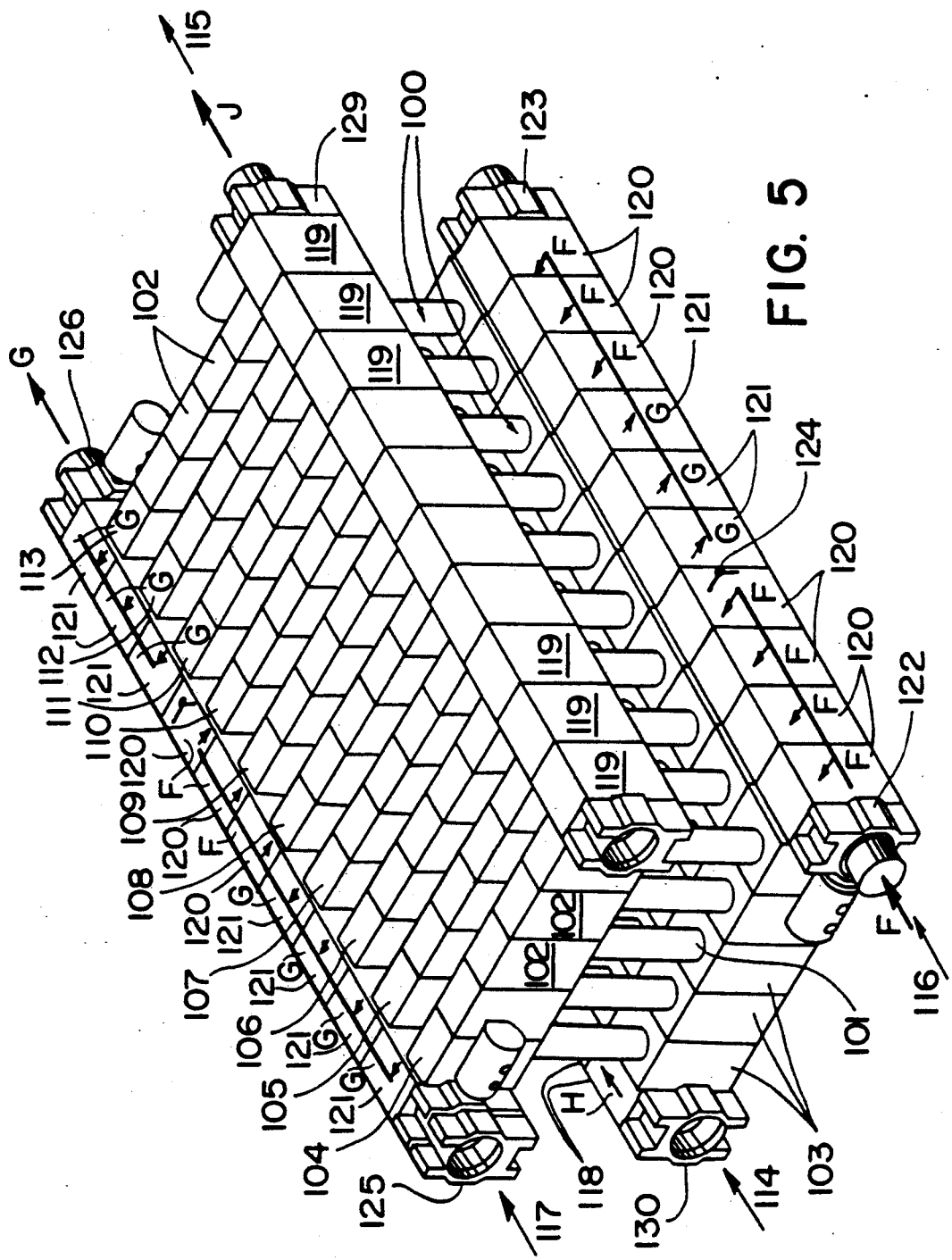
FIG. 5 is a perspective view of a bank of filter cartridges, the rows of which are connected together by end manifolds according to one embodiment of the invention.

The individual filter cartridges 100 shown in FIG. 5 are representations of the cartridge shown in a greater detail in FIGS. 1 to 4. Each cartridge 100 has a casing 101, a top header 102 and a bottom header 103. The cartridges 100 in each of rows 104 to 113 are connected together in the manner shown in FIG. 4 except that the closure plates at the end of each row are not required.

Flow through the filter banks shown in FIG. 5 is indicated by arrows F, G, H, and J where arrows F indicate feed inlet, arrows G treated feed outlet, arrows H filtrate outlet and arrow J filtrate exhaust.

As will be described below cartridge rows 104 to 107 are connected in parallel as are rows 108 to 110 and rows 111 to 113 with the groups of rows being connected in series. Each of the cartridge rows 104 to 107 has a filtrate outlet side 114 on the bottom left side, filtrate exhaust side 115 on the top right hand side, feed inlet side 116 on the bottom right hand side and a treated feed side 117 on the top left side.

The rows 104 to 113 are interconnected by manifolds 118 on the filtrate outlet side 114, manifolds 119 on the filtrate exhaust side 115, manifolds 120 on the feed inlet side 116 and manifolds 121 on the treated feed side 117. The virtue of using the cartridge design of FIGS. 1 to 4 is that filtrate manifolds 118 and 119 are of the same configuration and feed manifolds 120 and 121 are of the same configuration. As will be apparent below, filtrate manifolds 118 and 119 are substantially similar to feed manifolds 120 and 121 with the latter being virtual mirror images of the former save for the manner of sealing and the fluid flow paths.

As mentioned above, the cartridge rows 108 to 110 are themselves connected in parallel and are jointly connected in series with cartridge rows 104 to 107. The filtrate manifolds 118 and 119 of rows 108 to 110 are located on the same respective sides as the filtrate manifolds 118 and 119 of rows 104 to 107. Such is not the case with the feed manifolds 120 and treated feed manifolds 121 which are reversed with the feed manifold 120 being on the top left side and the treated feed manifolds being on the bottom right side of the filter bank. The manifolds of cartridge rows 111 to 113, which are serially connected with rows 108 to 110, are located on the same respective sides of the manifolds of cartridge rows 104 to 107.

At the upstream end of feed inlet side 116 there is a solenoid operated feed control valve 122 and at the downstream end of feed inlet side 116 there is a check valve 123. Downstream of feed manifold 120 at the end of cartridge row 107 there is a check valve 124 (shown diagrammatically).

At the upstream end of treated feed side 117 there is a solenoid operated backwash discharge control valve 125 and at the downstream end of the treated feed side 117 there is a solenoid operated recirculation control valve 126. Upstream of treated feed manifold 121 at the end of cartridge row 111 there is a check valve 127 (shown diagrammatically).

At the upstream end of filtrate exhaust side 115 there is a check valve 128 and at the downstream end there is a solenoid operated filtrate exhaust control valve 129. At the upstream end of filtrate outlet side 114 there is a check valve 130 and at the downstream end there is a solenoid operated filtrate outlet control valve (not shown). It will be appreciated that the parallel and series arrangements of the cartridge rows could be varied almost at will and indeed all the cartridge rows could be in parallel with one another.

Figure 6:
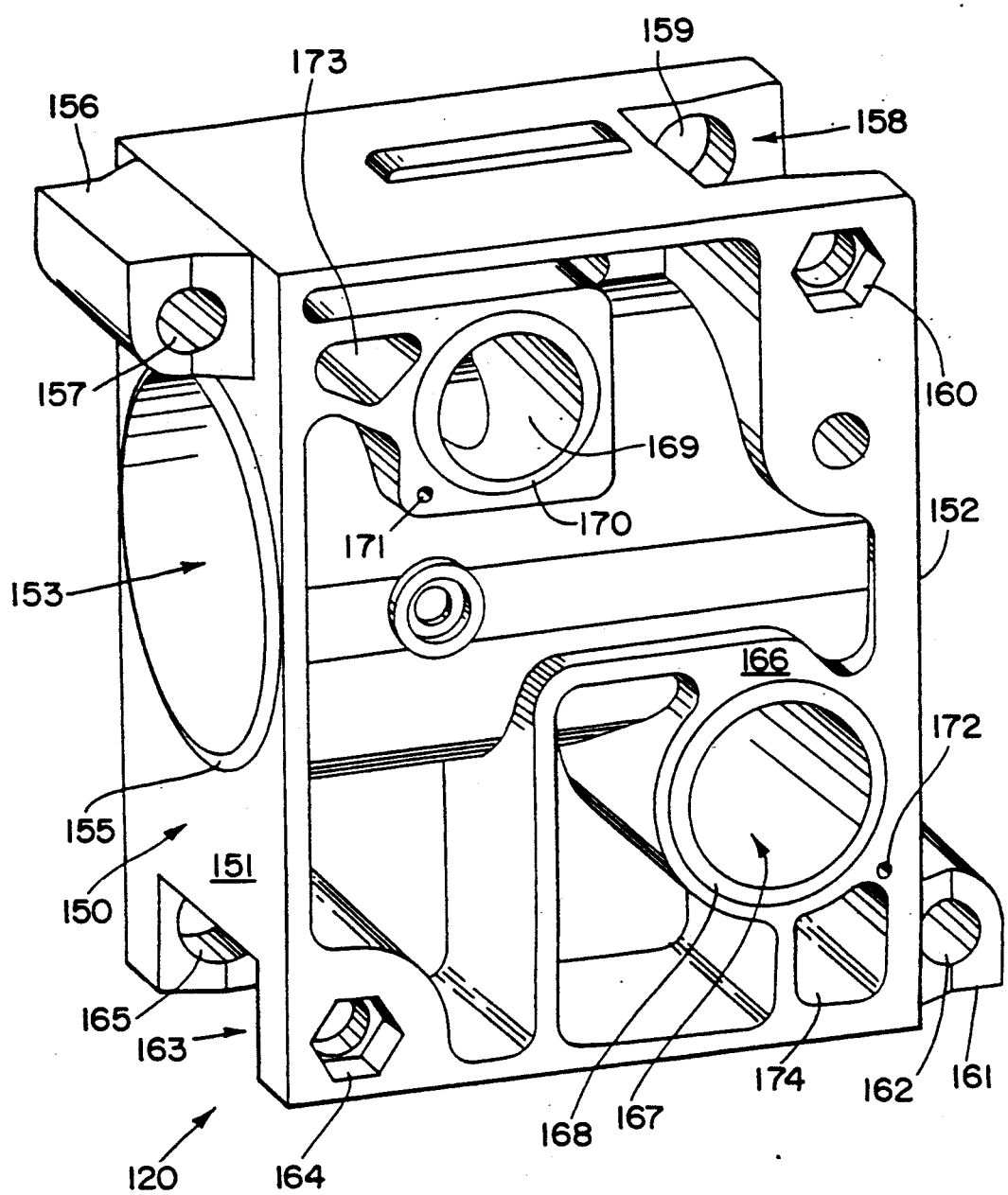
FIG. 6 is a perspective view, from one side, of an end manifold for the feed side of the bank of filters shown in FIG. 5 according to one embodiment of the invention.
Figure 7:
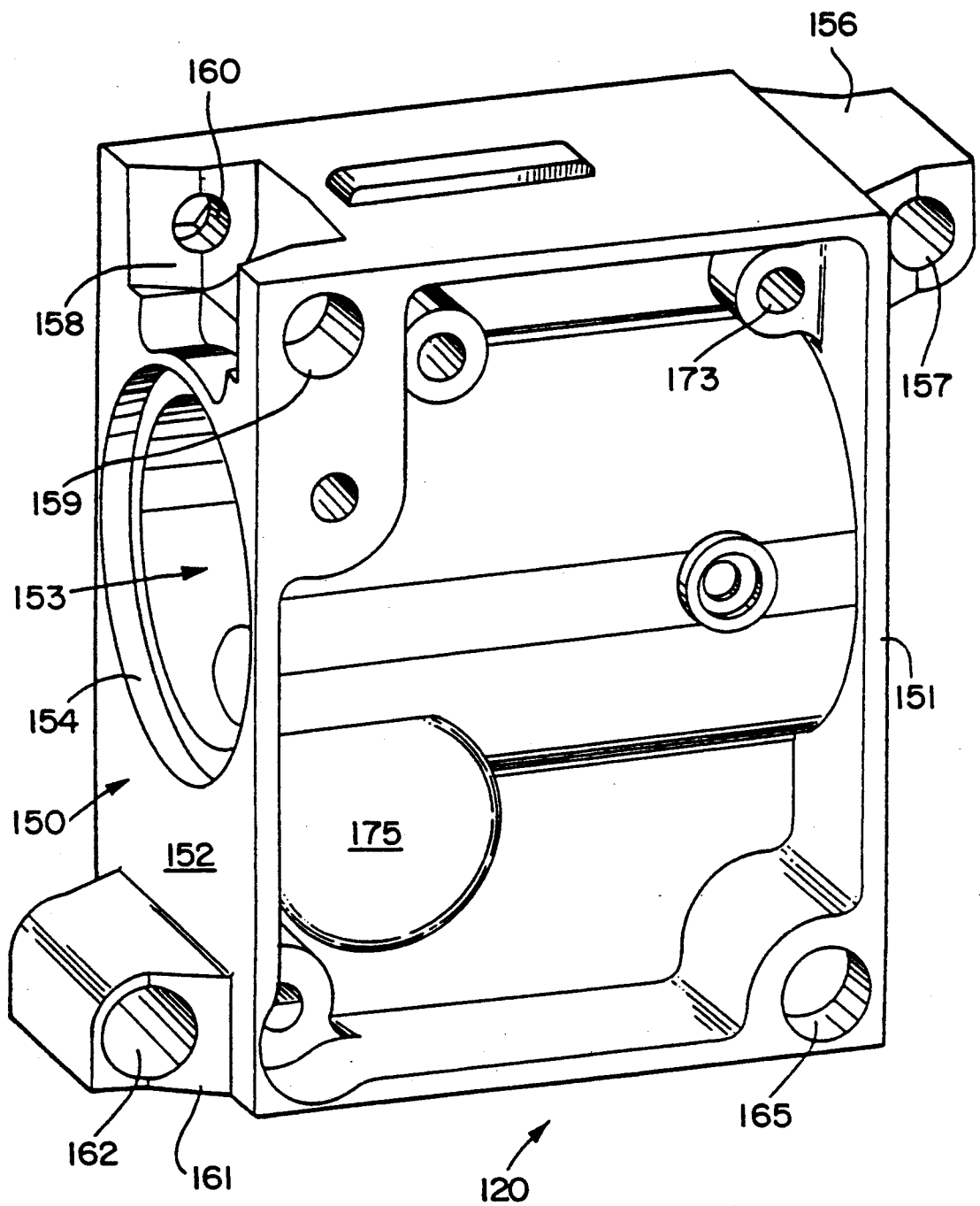
FIG. 7 is a perspective view from the other side of the manifold shown in FIG. 6.
Figure 8:
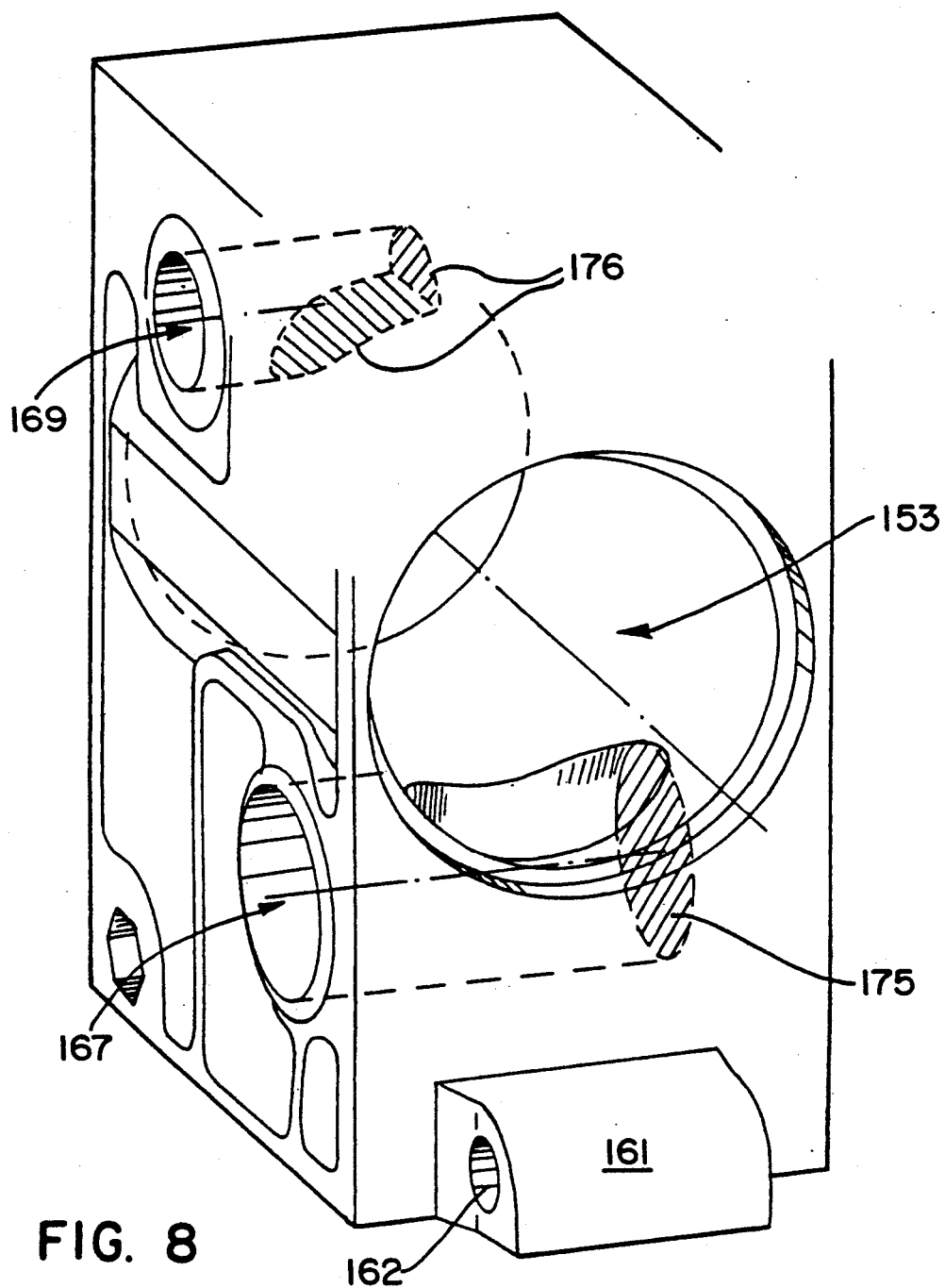
FIG. 8 is a partly broken away perspective view from one end of the manifold shown in FIG. 6.

The feed manifold 120 shown in FIGS. 6 to 8 includes a body 150 having planar end faces 151 and 152 which facilitate connection to an adjacent similar manifold. The body 150 defines a first or feed passageway 153 which extends through the body from end face 151 to end face 152. Around the opening to the passageway 153 in end face 152 (see FIG. 7) there is an annular recess 154 for receiving an "O" ring and around the opening to the passage way 153 in end face 151 there is a bevelled annular projection 151 adapted to engage "O" ring of an adjacent manifold.

At the top of face 151 there is a connecting lug 156 having a bolt passageway 157 and at the top face 152 there is a connecting recess 158 adapted to receive the connecting lug 156 of an adjacent manifold. On either side of the recess 158 there are apertures 159, 160 for receiving a connecting bolt (not shown). Similarly, there is a connecting lug 161 at the bottom of face 152 having a bolt passageway 162 and a connecting recess 163 at the bottom of face 151. Apertures 164, 165 are provided on either side of the recess 163 for receiving a connecting bolt (not shown).

In the front face 166 of the manifold 150 there is a second passageway 167 in fluid communication with the first front face 166. On the end of passageway 167 there is a bevelled annular projection 168 adapted to engage the "O" ring 31 around the feed passageway 27 of the cartridge shown in FIGS. 1 to 4.

The body 150 also defines a third or blind passageway 169 which has a bevelled annular projection 170 around its open end on front face 166 to engage the "O" ring 40 around the inlet 38 to the filtrate passageway 34 of the cartridge shown in FIGS. 1 to 4 to provide a fluid tight seal of the manifold against the header of the filter cartridge. The configuration of passageways 167 and 169 can be seen in FIG. 8 with the end wall 175 of the passageway 167 being evident in FIGS. 7 and 8 and the blind end 176 of the passageway 169 being evident in FIG. 8.

Recesses 171 and 172 in front face 166 are adapted to receive locating lugs 46 on the cartridge shown in FIGS. 1 to 4. Apertures 173 and 174 formed in the body 105 are aligned with apertures 60 and 61 of the cartridge shown in FIGS. 1 to 4 and are adapted to receive locking bolts (not shown) for securing the manifold to the cartridges.

It will be appreciated that with the feed manifold 120, flow of feed is into the feed passageway 153 through the opening in face 151 to the opening in face 152 and thence to the next manifold with a portion of the feed being discharged through the second passageway 167 into the header of the cartridge. The flow in the treated feed manifold 121 (which is of the same configuration as the feed manifold 120) is reversed with the treated feed entry being through the opening of passageway 167 in face 166 and joining the flow of treated feed from face 152 to face 151 of the body 150.

Figure 9:
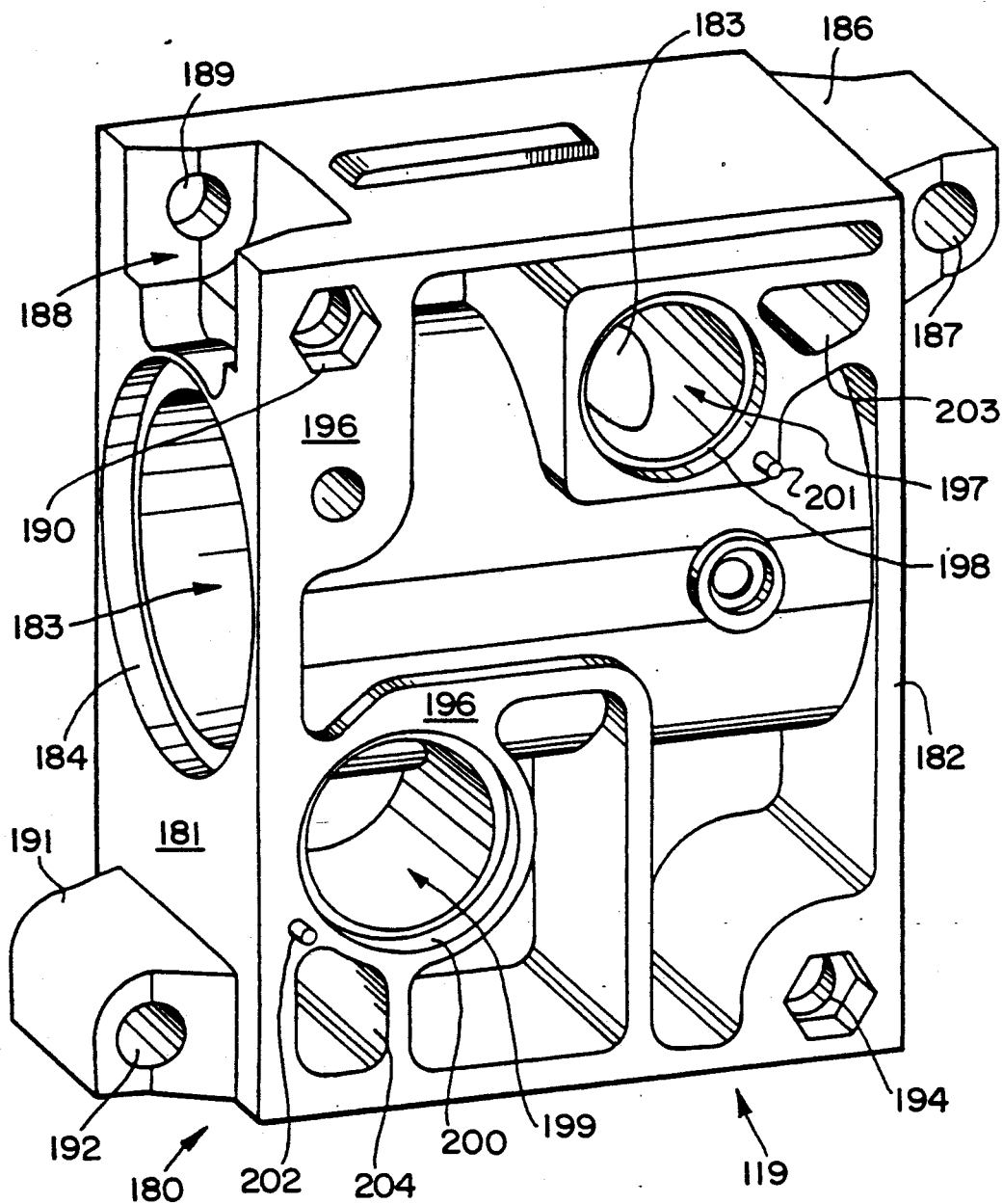
FIG. 9 is a perspective view, from one side, of an end manifold for the filtrate side of the bank of filters shown in FIG. 5 according to a second embodiment of the invention.
Figure 10:
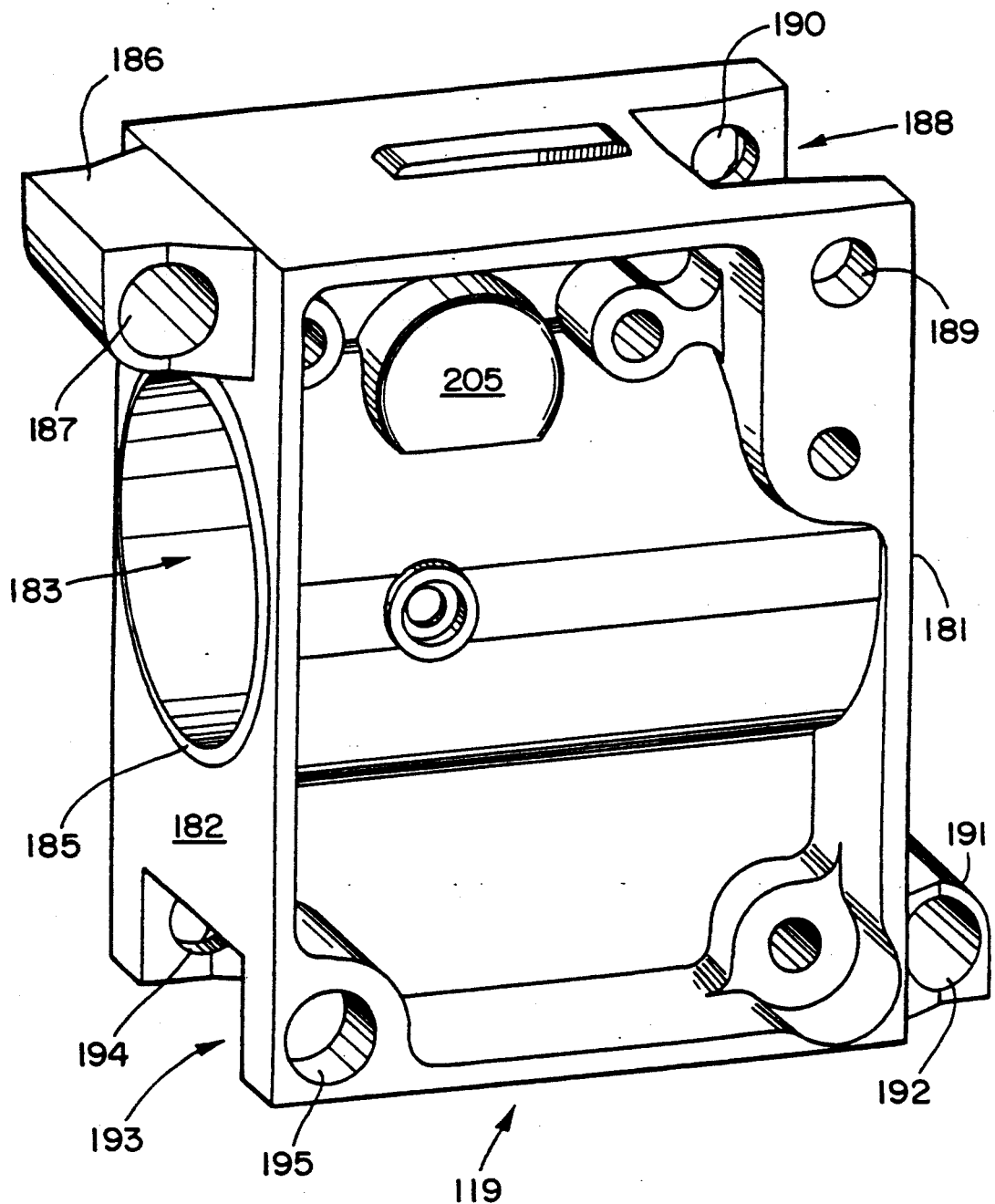
FIG. 10 is a perspective view from the other side of the manifold shown in FIG. 9.
Figure 11:
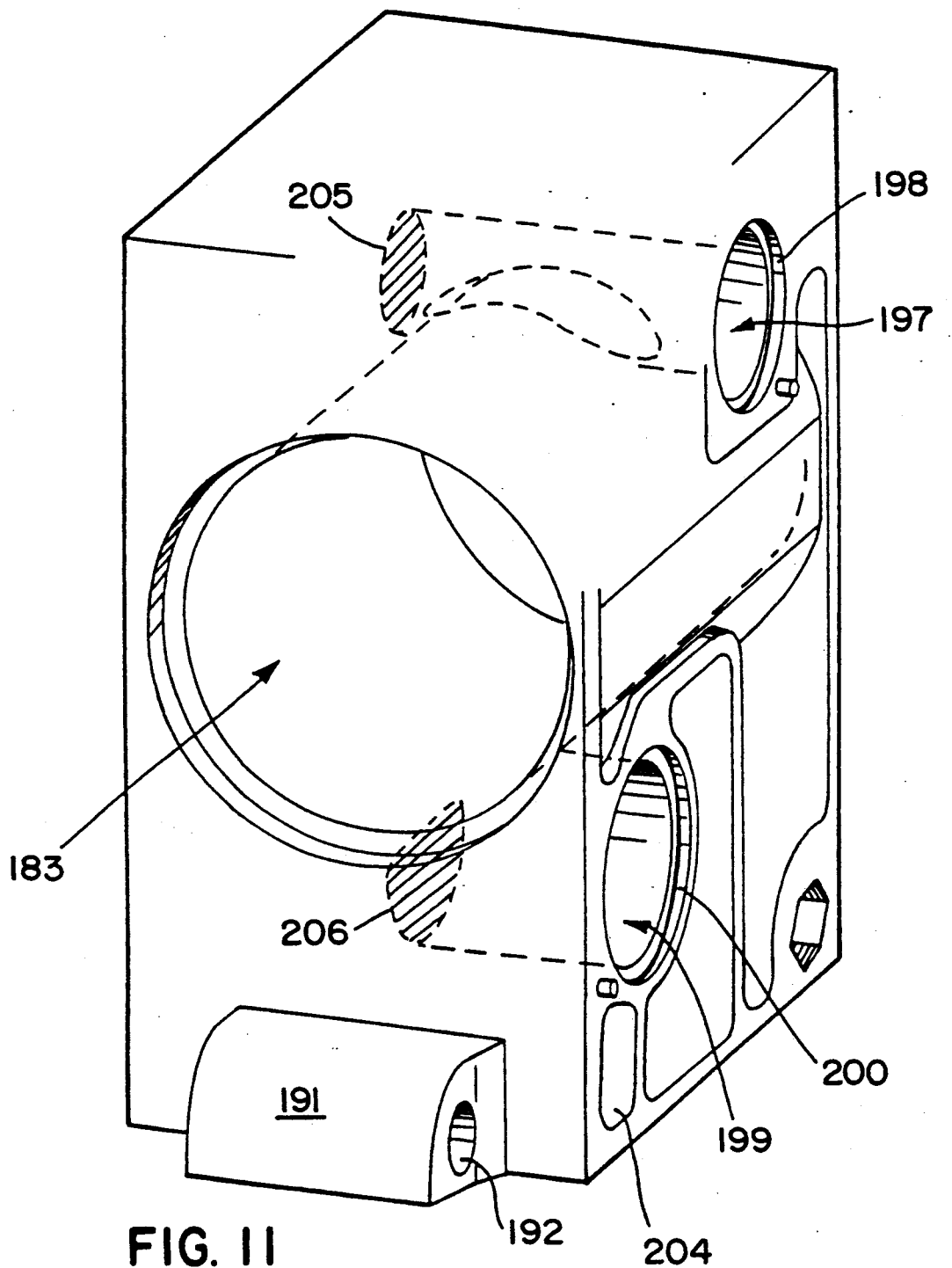
FIG. 11 is a partly broken away perspective view from one end of the manifold shown in FIG. 9.

The filtrate manifold 119 shown in FIGS. 9 to 11 is substantially similar to the feed manifold 120 shown in FIGS. 6 to 8 and includes a body 180 having planar end faces 181 and 182 which facilitate connection to an adjacent manifold. The body 180 defines a first or filtrate passageway 183 which extends through the body from end face 181 to 182. Around the opening to passageway 183 end face 181 there is an annular recess 184 for receiving an "O" ring and around the opening to passageway 183 end face 182 (see FIG. 10) there is a bevelled annular projection adapted to engage the "O" ring of an adjacent manifold.

At the top of face 182 there is a connecting lug 186 having a bolt passageway 187 and at the top of face 181 there is a connecting recess 188 adapted to receive the connecting lug 186 of an adjacent manifold. On either side of recess 188 there are apertures 189, 190 for receiving a connecting bolt (not shown). Similarly, there is a connecting lug 191 at the bottom of face 181 having a bolt passageway 192 and a connecting recess 193 at the bottom of face 182. Apertures 194, 195 are provided on either side of recess 163 for receiving a connecting bolt (not shown).

In the front face 196 of the manifold 199 there is a second passageway 197 in fluid communication with the first passageway 183. Around the opening to passageway 197 in the front face 196 there is an annular recess 198 adapted to receive an "O" ring (not shown).

The body 180 also defines a third or blind passageway 199 which has an annular recess 200 around its open end in face 196 to receive an "O" ring (not shown). The "O" rings in recesses 198 and 200 are engaged by the bevelled projections 32 and 41 of the top header of the cartridge shown in FIGS. 1 to 4 to provide a fluid tight seal of the manifold against the header. The configuration of the passageways 197 and 199 can be seen in FIG. 11 with the end wall 205 of passageway 197 being evident in FIGS. 10 and 11 and the blind wall 206 of passageway 199 being evident in FIG. 11.

Projections 201 and 202 in front face 196 are adapted to be located in recesses formed in the top header of the cartridge shown in FIGS. 1 to 4. Apertures 203 and 204 formed in the body 180 are aligned with apertures 61 and 60 the cartridge shown in FIGS. 1 to 4 and are adapted to receive locking bolts (not shown) for securing the manifold to the cartridges.

It will be appreciated that with filtrate manifolds 118 and 119, flow of filtrate is into passageway 197 from the cartridge header and thence into the passageway 183 for delivery to an adjacent manifold.

Figure 12:
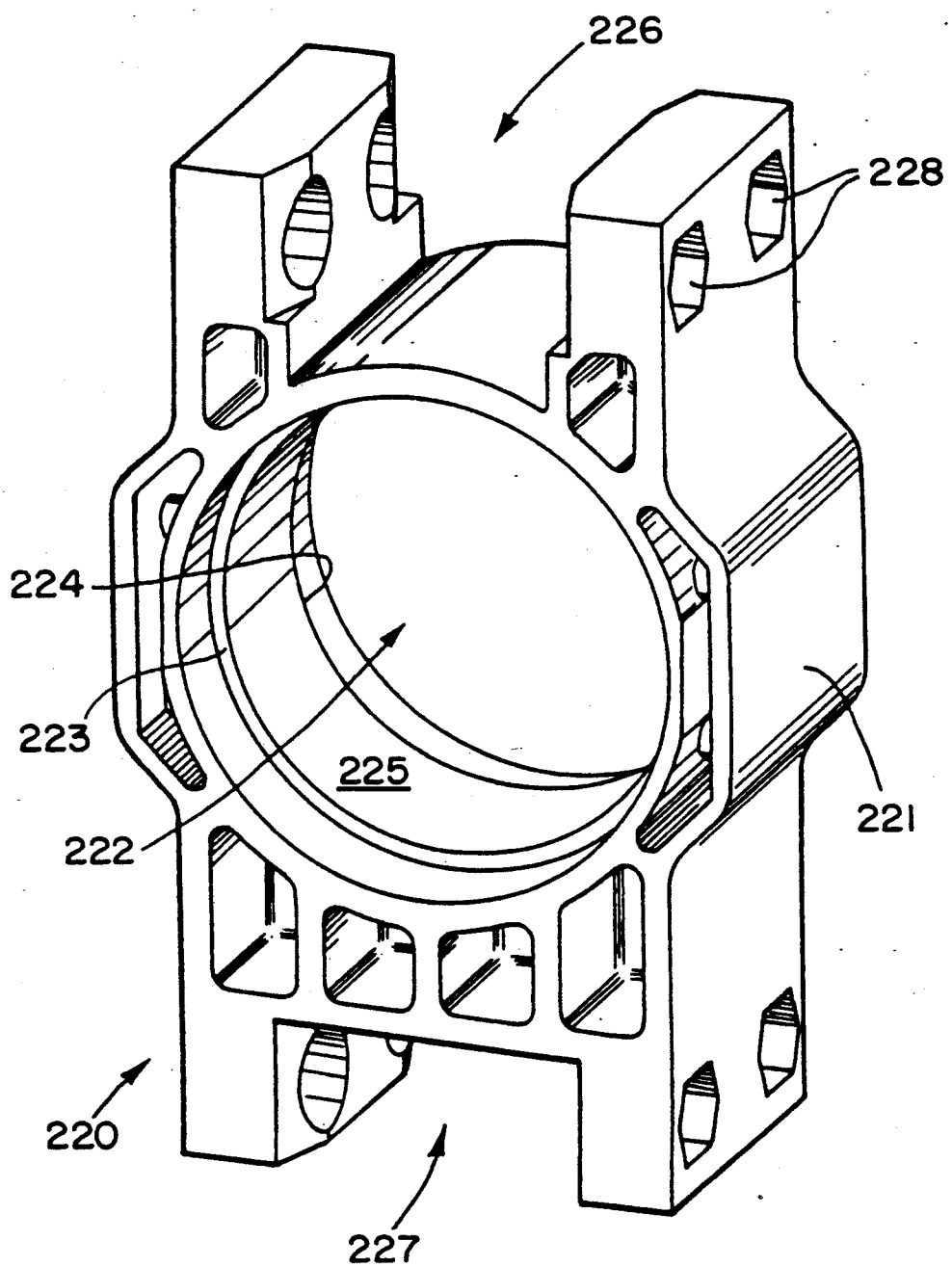
FIG. 12 is a perspective view of a valve housing for the bank of filters shown in FIG. 5.

The valve housing 220 shown in FIG. 12 includes a body 221 that defines a passageway 222 having valve seats 223 and 224 on either side of the annular shoulder 225. Any convenient valve member or plate may be installed against the appropriate seat 223 or 224.

At the top and bottom of the housing 220 there are recesses 226 and 227 for receiving the connecting lugs of the manifolds 118, 119, 120 or 121. Apertures 128 are adapted to receive connecting bolts (not shown).

Figure 13:
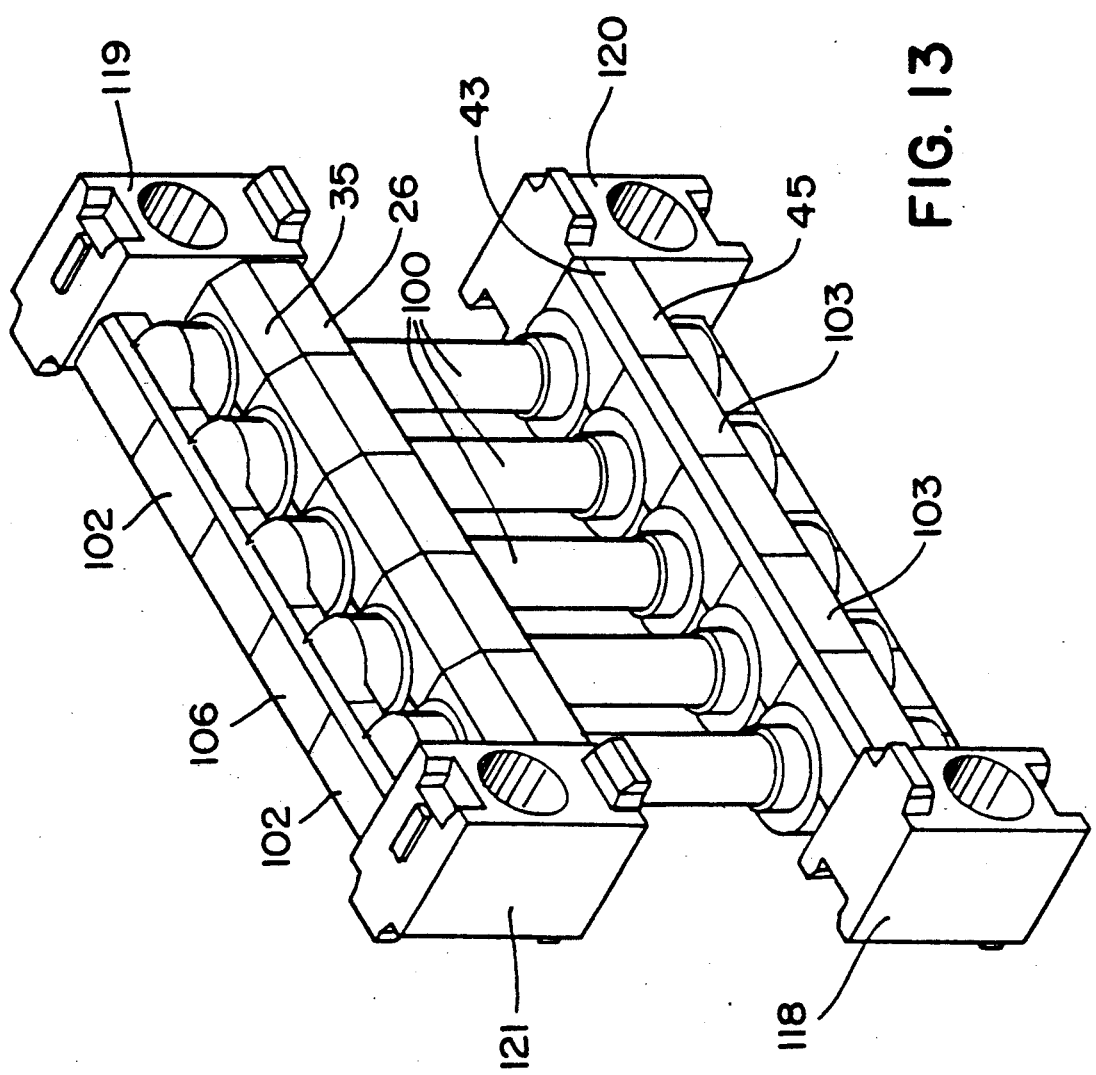
FIG. 13 is a perspective view of a cartridge row with manifolds connected.

Referring to FIG. 13, row 106 of cartridges 100 (refer FIG. 5) is shown in assembled form complete with filtrate manifolds 118, 119 attached and feed manifold 120 and treated feed manifold 121 also attached. As previously described, each cartridge 100 has a top portion 35 and a bottom portion 45, both of which include respective offset portions 26, 43. It is to be noted that both offset portions 26, 43 are offset on the same side of the cartridge 100 such that the offset portion 26 of top portion 35 "overhangs" offset portion 43 of bottom portion 45. In this embodiment top portion 35 is a mirror of bottom portion 45 about a plane which perpendicularly intersects the longitudinal axis of cartridge 100 at a mid-point along that cartridge.

This mirror image symmetry allows the identical feed manifold structure as illustrated and described in respect of FIGS. 6 to 9 to be used without alteration both as feed manifold 120 and treated feed manifold 121 located diagonally opposite each other about the row 106. Similarly, this characteristic of the cartridge structure allows identical filtrate manifolds 118, 119 as described and illustrated with respect to FIGS. 9 to 11 to be used on diagonally opposite sides of the row 106.

Figure 14:
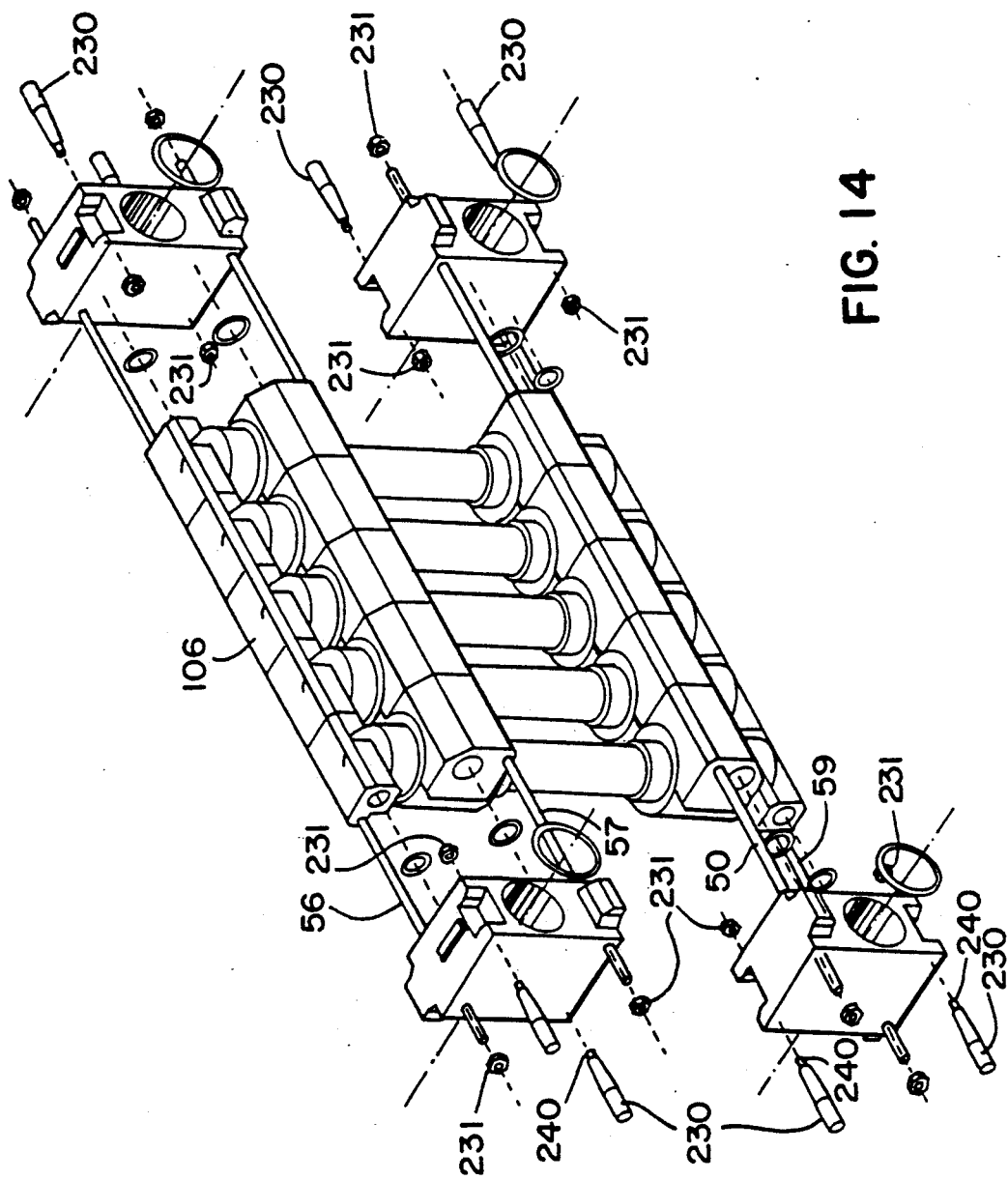
FIG. 14 is an exploded view of FIG. 13 including detail of fastening elements and seals.

FIG. 14 shows an exploded view of FIG. 13 which clearly shows details of previously described bolts 56, 57, 58 and 59 used to hold the manifolds and headers together as a unitary, fluid sealed structure.

In the embodiment shown in FIG. 14, tapered pins 230 are utilised to pass through the bolt passageways for the purposes of affixing the connecting lugs to adjacent, abutting manifolds. The leading, thin end of each tapered pin 230 includes an end flange 240 which is rectangular in shape and sized to fit through a corresponding rectangular aperture in a receiving nut 231, 235 and 239. The arrangement is such that when the tapered pin 230, 234, 238 is passed through the apertures and bolt passageways and thence through the nut 231, 235, 239, a sufficient distance for the rectangular flange to clear the nut, the tapered pin can then be rotated through 90° whereupon the rectangular flange 240 rests across the top of the rectangular aperture in the nut 231, 235, 239 thereby preventing the pin from being withdrawn from the manifold structure. The tapering of the pin allows ease of insertion of the pin and helps to urge the manifold components into appropriate sealing alignment. The wide end of the pin is sufficiently wide that it will not pass through the apertures in the manifold through which the majority of the pin is passed.

The pin can be rotated through 90° by use of a suitable tool which engages with the protruding, wide end of the pin.

Figure 15:
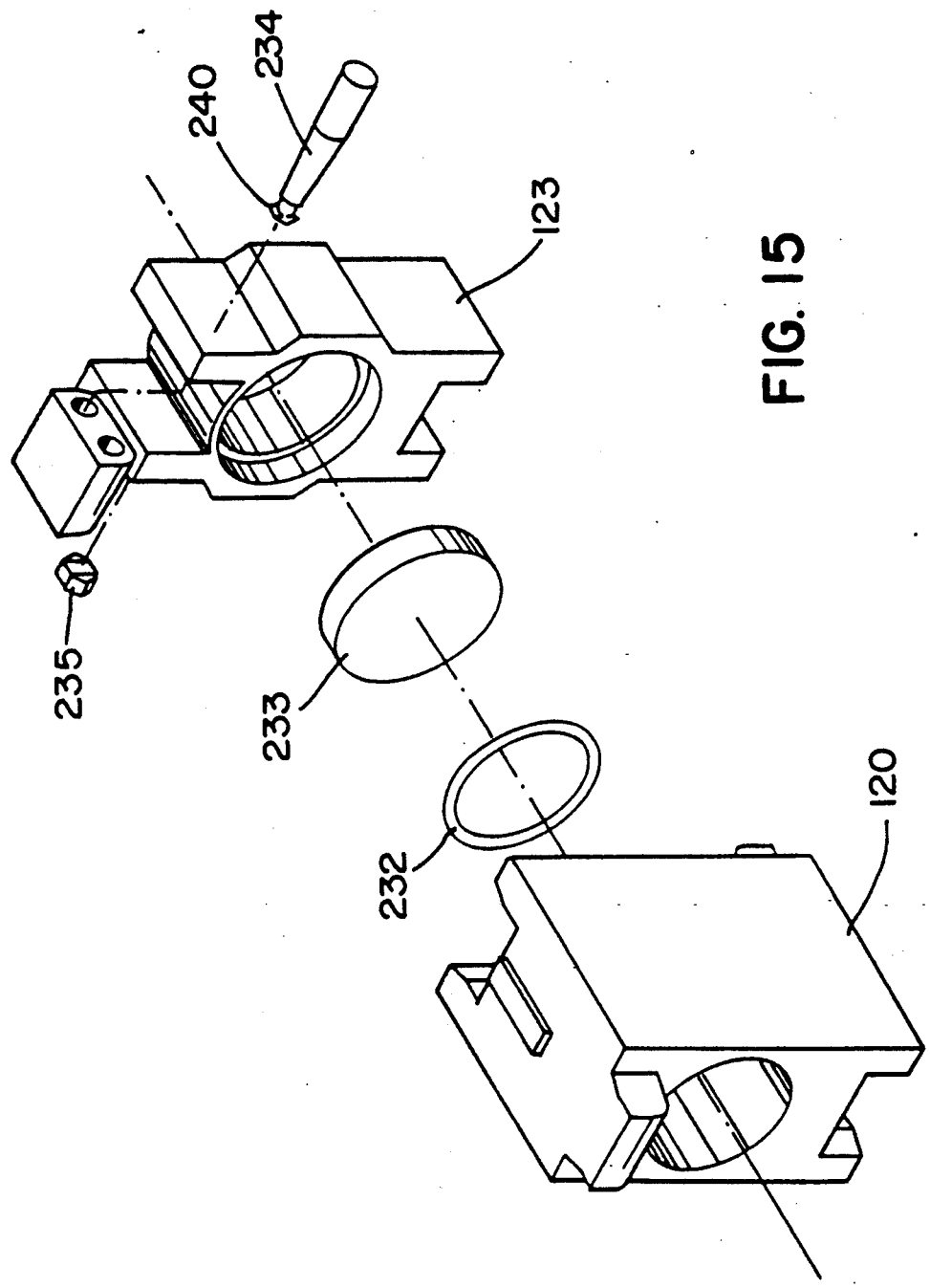
FIG. 15 is a perspective view of a blanking plate connection.

FIG. 15 shows the relationship between a blanking plate 233, an "O" ring 232, manifold 120 and check valve housing 123 (refer FIG. 5). Blanking plate 233 locks treated feed flow from exiting through check valve 123.

Figure 16:
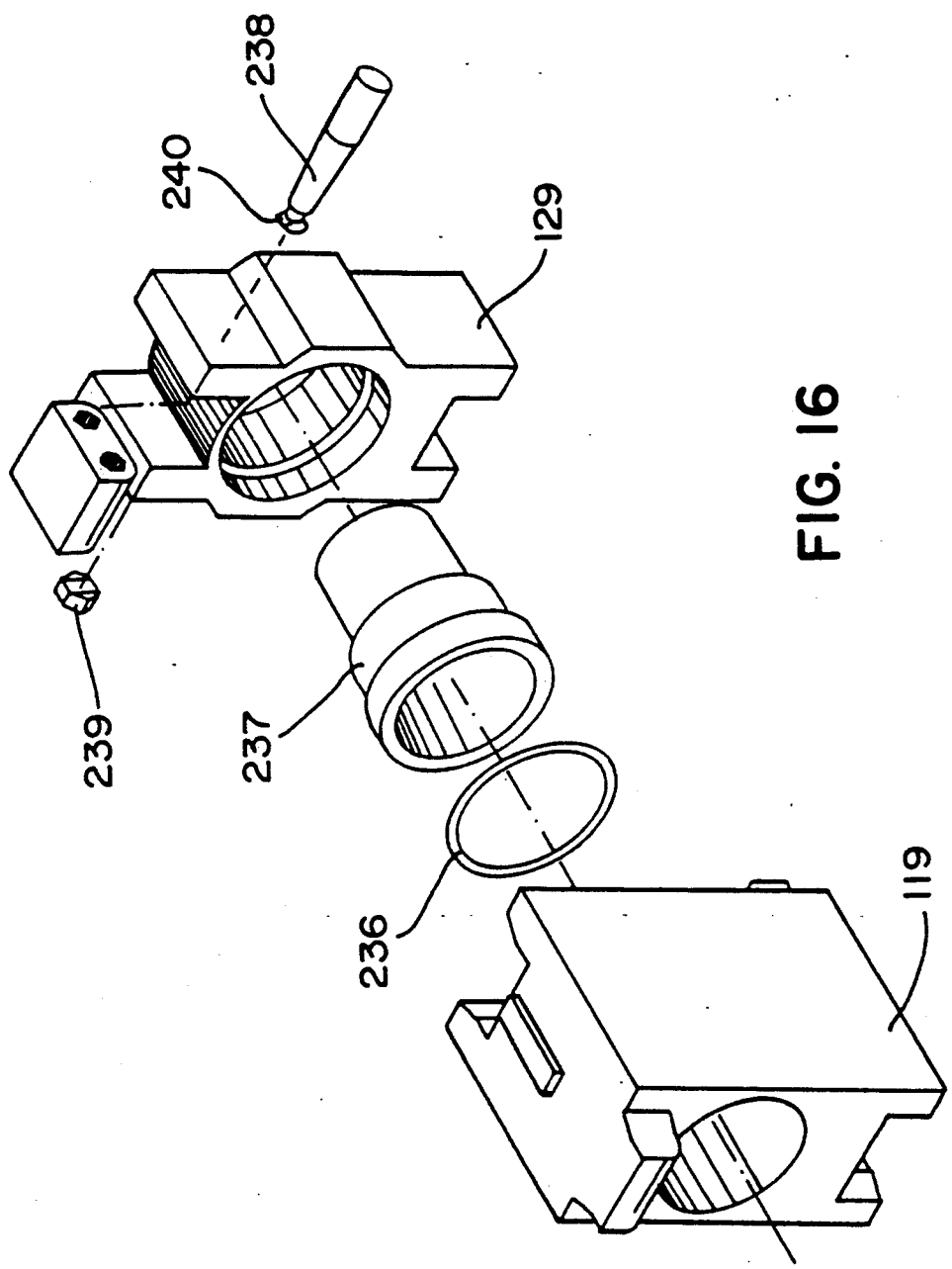
FIG. 16 is a perspective, exploded view of a spigot connection to a filter bank.

FIG. 16 shows the relationship between a spigot 237, "O" ring 236, manifold 119 and filtrate exhaust control valve 129 (refer FIG. 5). The end of spigot 237 extends beyond the end of the cartridge bank and is used to allow easy attachment of pipework by gluing or other welding techniques.

Figure 17:
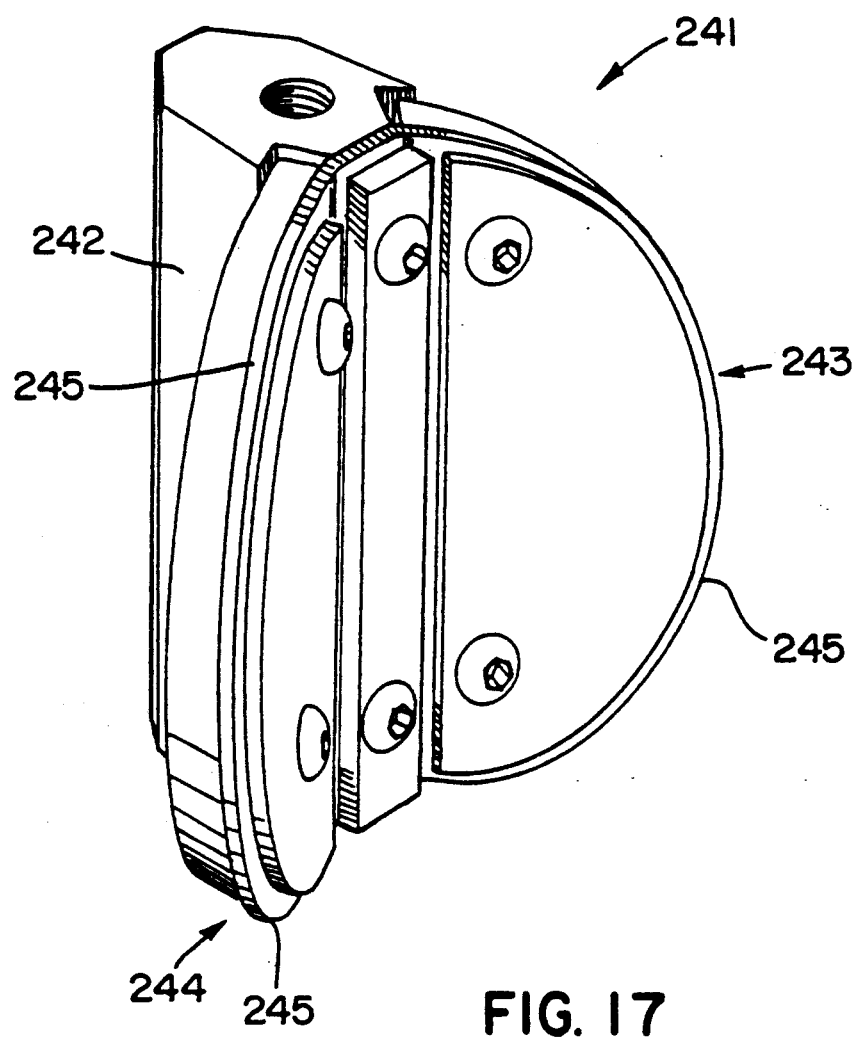
FIG. 17 is a perspective view of a butterfly valve which is utilised as a check valve.

FIG. 17 shows a perspective view of a wafer valve. The wafer valve 241 includes a spine 242 to which are hingedly and longitudinally connected wings 243, 244. A circular sealing membrane 245 is affixed across the faces of both wings 243, 244. The wafer valve 241 is inserted in the feed line of the manifolds so that the seal 245 faces the oncoming flow of feed, thereby sealing off feed flow beyond the wafer valve 241.

The wafer valve is adapted to fit within the annular recess 154 of the opening to the passageway 153 in end face 152 of the feed manifold 120 (FIG. 7). The wafer valve 241 is also adapted to fit within the corresponding annular recess 154 of the filtrate manifold 180 (FIG. 9). The valve can therefore be used at any point along the feed, treated feed or filtrate lines defined by the manifolds. With particular reference to FIG. 5 the valve can be inserted into the manifolds designated as including check valves 124 and 127. The wafer valve can also be used in the filtrate lines to control filtrate line pressure so as to ensure transmembrane pressures remain approximately constant throughout the array of cartridges.

During backwashing, when a purely parallel feed structure of manifold rows is desired, backflush fluid is introduced in the opposite direction to normal feed which causes the wings 243, 244 to hinge inwardly thereby allowing backwash fluid flow past the butterfly valve 241.

Various modifications may be made in details of design and construction without departing from the scope and ambit of the invention.

We claim:

1. Filter cartridge connector means for a filter installation of the type in which a plurality of filter cartridges are assembled into rows joined at their ends with a plurality of said connector means to form a plurality of rows of interconnected filter cartridges, characterized in that said connector means comprises a manifold having a body having planar faces at opposite ends to facilitate connection to similar adjacent manifolds, a first fluid passageway through the body providing communication from one end of the body to the other so as to permit fluid connection with adjacent manifolds, a second fluid passageway adapted to be coupled to a filter cartridge to provide fluid communication between the cartridge and the first passageway when so assembled; said manifold further including a third fluid passageway adapted to be coupled to the filter cartridge to provide fluid communication between the cartridge and the first fluid passageway independently of said second fluid passageway.

2. The filter cartridge connector means of claim 1 wherein said second fluid passageway comprises a feedstock passageway and said third passageway comprises a filtrate passageway.

3. The filter cartridge connector means of claims 2 wherein said feedstock passageway is generally of larger diameter than said filtrate passageway.

4. The filter cartridge connector means of claim 3 wherein said feedstock passageway is blocked to prevent fluid communication between said feedstock passageway and said first passageway whereby said manifold is used exclusively as a filtrate manifold for conducting filtrate from said filter cartridge and into said first passageway.

5. The filter cartridge connector means of claim 3 wherein said filtrate passageway is blocked whereby only said feedstock passageway is in fluid communication between said filter cartridge and said first passageway.

6. The filter cartridge connector means of claim 1 wherein said second fluid passageway lies generally at right angles to and intersects a portion of said first passageway.

7. The filter cartridge connector means of claim 1 wherein said second fluid passageway and said third fluid passageway lie generally at right angles to said first passageway and are aligned so as to intersect with at least a portion of said first passageway.

8. The filter cartridge connector means of claim 7 wherein said second and third passageways are parallel to each other.

9. The filter cartridge connector means of claim 1 wherein a first end of said first fluid passageway includes a bevelled portion protruding beyond a first end face of said manifold and a complementary recessed peripheral portion at an opposite end face of said manifold.

10. The filter cartridge connector means of claim 1 further including at least one locating lug protruding from a lateral face of said manifold; said locating lug adapted to be seated in corresponding recesses in said filter cartridge so as to positively locate said manifold with respect to said filter cartridge.

11. The filter cartridge connector means of claim 1 wherein said first fluid passageway is of generally circular cross-section throughout.

12. The filter cartridge connector means of claim 1 wherein conduit means is provided through said filter cartridge connecting an outer lateral face of said manifold to an inner lateral face of said manifold; said inner face of said manifold adapted to abut against said filter cartridge whereby said second fluid passageway and said third fluid passageway are coupled to said filter cartridge; said conduit adapted to receive a fastening element therethrough; said fastening element mechanically attaching to a part of said filter cartridge whereby said manifold is mechanically urged against said cartridge.

13. The filter cartridge connector means of claim 1 further including at least one protrusion on both of said planar opposite ends; said protrusion adapted to mate with a corresponding recess in the planar opposite ends of abutting ones of said adjacent manifolds.

14. The filter cartridge connector means of claim 13 wherein each said recess is defined by an outer flange and inner flange forming a part of said outer face and said inner face respectively of said manifold; said outer flange and said inner flange including coaxial conduit means which aligns with a corresponding conduit in a mating one of said protrusions whereby a fastener element can be passed through said conduit so as to anchor said protrusion within said recess whereby said adjacent manifolds are maintained mechanically connected to said manifold.

15. The filter cartridge connector means of claim 14 wherein said fastener element comprises a tapered pin.

16. The manifold of claim 1 wherein said body of said cartridge is formed with a recess around the opening to the first fluid passageway in one end face for receiving an "O" ring and a bevelled annular projection around the opening to the first passageway in the other end face which is adapted to engage the "O" ring of an adjacent manifold.

17. The filter cartridge connector means of claim 1 wherein the end faces of said manifold include locking means adapted to engage complementary locking means on an adjacent manifold.

18. A filter installation comprising a plurality of rows of interconnected filter cartridges each said cartridge having a feed inlet, a treated outlet and a filtrate outlet, filter cartridge connector means as claimed in claim 1 at each end of each row of cartridges for providing feed to each row, for withdrawing treated feed from each row, and for withdrawing filtrate from each row, the connector means being interconnected so that at least two of the rows may be connected in parallel.

19. The filter installation of claim 18 further including check valve means whereby a first plurality of rows of interconnected filter cartridges connected in parallel are serially connected to a second plurality of rows of interconnected filter cartridges connected in parallel.

20. The filter installation of claim 19 wherein said check valve means comprises a one way valve which acts as a check valve during normal filter operation but allows backwashing fluid to pass in a reverse direction during backwashing operations whereby all filter cartridges are connected in parallel during said backwashing operation.

21. The filter installation of claim 20 wherein said check valve means comprises a wafer valve.

22. The filter installation of claim 18 wherein each said cartridge includes a first header at one end of said cartridge and a second header at an opposite end of said cartridge; said first header and said second header including an offset portion with respect to the longitudinal axis of said cartridge; said first header being a mirror of said second header about a plane perpendicular to and passing through a mid-point of the longitudinal axis of said cartridge.

23. The filter installation of claim 22 wherein said feed inlet and said filtrate outlet are placed within said first header and said treated feed outlet and said filtrate outlet are placed in said second header.

24. The filter installation of claim 23 wherein said feed inlet of said first header has the same dimension as said treated feed outlet in said second header and said filtrate outlet in said first header and said filtrate outlet in said second header have the same dimension and same relationship whereby said filter cartridge connector means for withdrawing treated feed is adapted for connection to either said first header or said second header without further mechanical alteration and said filter cartridge connector means for withdrawing filtrate is adapted for connection to either said first header or said second header without further mechanical alteration.

25. Filter cartridge connector means for a filter installation of the type in which a plurality of filter cartridges are assembled into rows joined at their ends with a plurality of said connector means to form a plurality of rows of interconnected filter cartridges, characterized in that said connector means comprises a manifold having a body having planar faces at opposite ends to facilitate connection to similar adjacent manifolds, a first fluid passage through the body providing communication from one end of the body to the other so as to permit fluid connection with adjacent manifolds, a second fluid passageway adapted to be coupled to a passageway of the cartridge to provide fluid communication between the cartridge and the first passageway when so assembled and wherein conduit means is provided through said filter cartridge connecting an outer face of said manifold to an inner face of said manifold; said inner face of said manifold adapted to abut against said filter cartridge whereby said second fluid passageway is coupled to said passageway of said filter cartridge; said conduit adapted to receive a fastening element therethrough; said fastening element mechanically attaching to a part of said filter cartridge whereby said manifold is mechanically urged against said cartridge.

26. Filter cartridge connector means for a filter installation of the type in which a plurality of filter cartridges are assembled into rows joined at their ends with a plurality of said connector means to form a plurality of rows of interconnected filter cartridges, characterized in that said connector means comprises a manifold having a body having planar faces at opposite ends to facilitate connection to similar adjacent manifolds, a first fluid passage through the body providing communication from one end of the body to the other so as to permit fluid connection with adjacent manifolds, a second fluid passageway adapted to be coupled to a passageway of a filter cartridge to provide fluid communication between the cartridge and the first passageway when so assembled, said filter cartridge connector means further including at least one protrusion on both of said planar opposite ends; said protrusion adapted to mate with a corresponding recess in the planar opposite ends of abutting ones of said adjacent manifolds.

27. Filter cartridge connector means for a filter installation of the type in which a plurality of filter cartridges are assembled into rows joined at their ends with a plurality of said connector means to form a plurality of rows of interconnected filter cartridges, characterized in that said connector means comprises a manifold having a body having planar faces at opposite ends to facilitate connection to similar adjacent manifolds, a first fluid passage through the body providing communication from one end of the body to the other so as to permit fluid connection with adjacent manifolds, a second fluid passageway adapted to be coupled to a passageway of a filter cartridge to provide fluid communication between the cartridge and the first passageway when so assembled, and wherein said body of said manifold is formed with a recess around the opening to the first passageway in one end face for receiving an "O" ring and a bevelled annular projection around the opening to the first passageway in the other end face which is adapted to engage the "O" ring of an adjacent manifold.

* * * * *